UNITED STATES PATENT OFFICE.

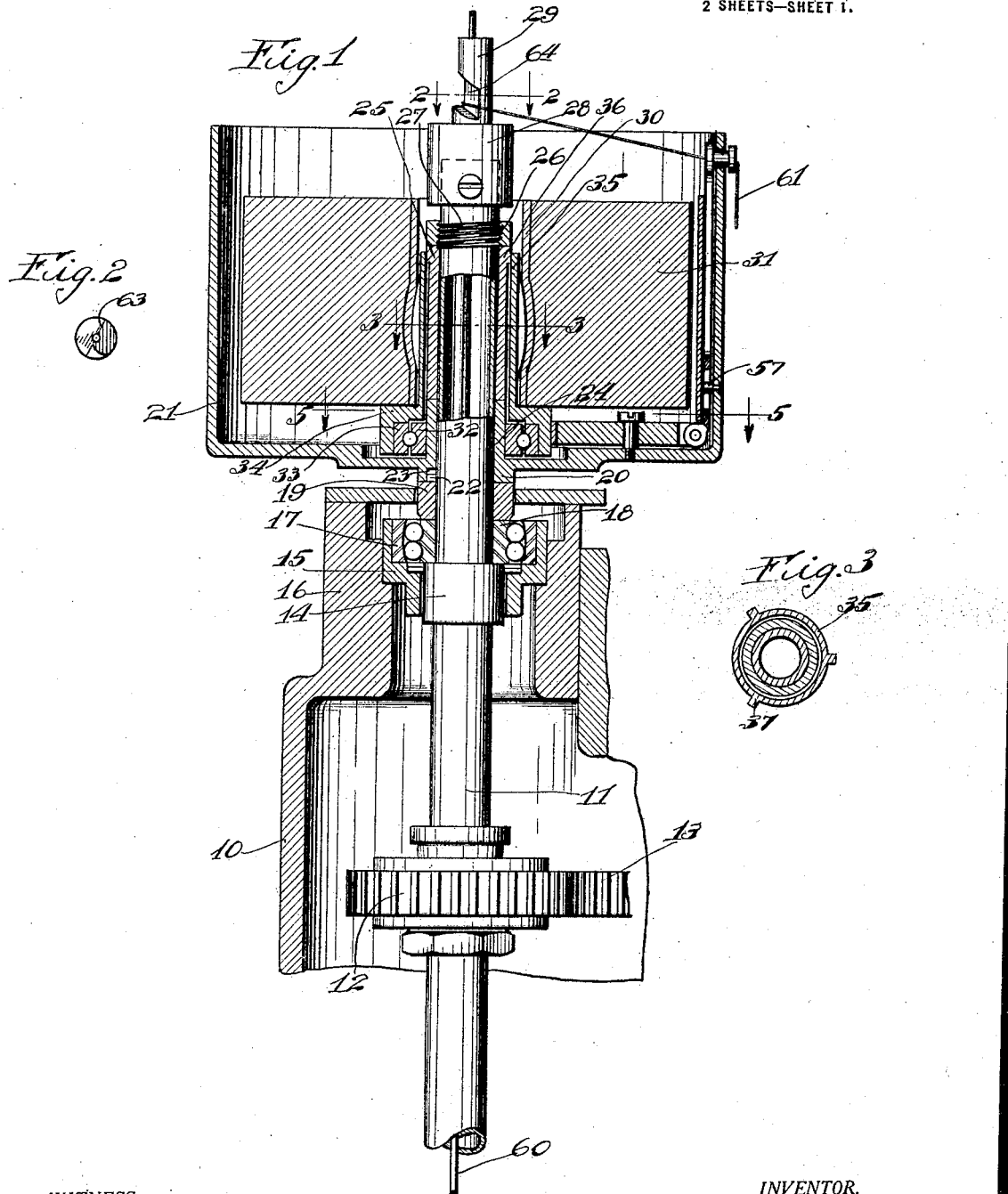

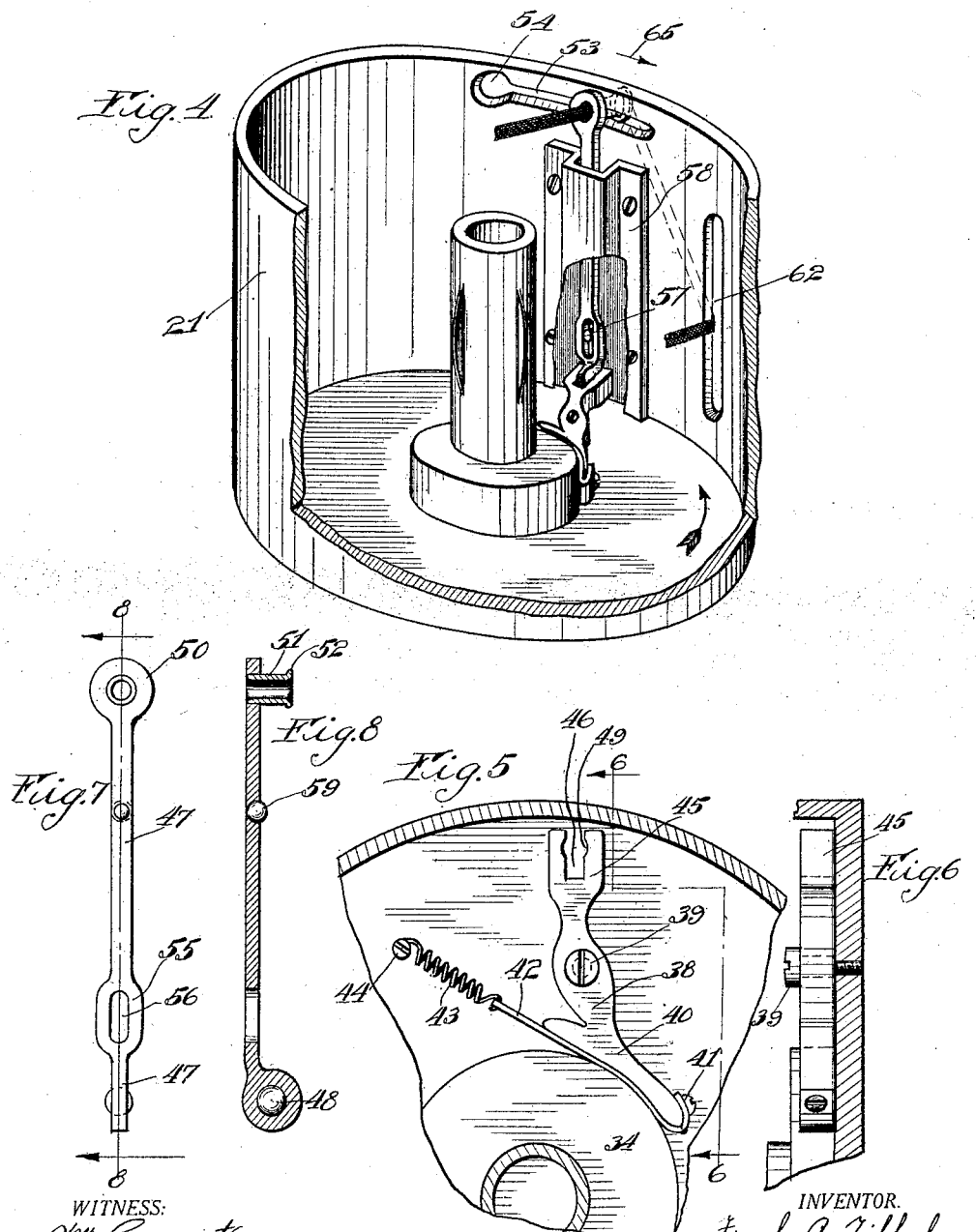

FRANK A. TIBBALS, OF RIVERSIDE, ILLINOIS, ASSIGNOR TO BELDEN MANUFACTURING COMPANY, OF CHICAGO, ILLINOIS, A CORPORATION OF ILLINOIS.

INSULATING HEAD.

1,411,676.   Specification of Letters Patent.   Patented Apr. 4, 1922.

Application filed April 1, 1920. Serial No. 370,594.

*To all whom it may concern:*

Be it known that I, FRANK A. TIBBALS, a citizen of the United States, residing at Riverside, in the county of Cook and State of Illinois, have invented certain new and useful Improvements in Insulating Heads, of which the following is a specification.

My invention relates to improvements in insulating heads and has particular reference to insulating heads of the type in which the insulating or wrapping material is wound on a paper tube capable of being rotated around the wire or cable which is to be insulated.

The principal objects of the invention are to provide means for maintaining a substantially uniform tension on the wrapping material independently of the diameter of the tube of material or other varying conditions; to provide an arrangement so organized as to be applicable to approved types of wrapping or insulating devices; to provide an arrangement which will not affect the regularity or rapidity with which the material may be wrapped around the wire; to provide an improved arrangement of the class described which will in a large measure prevent injury to or breakage of the wrapping material; to provide an arrangement which will permit insertion or replenishing of the tube of the wrapping material quickly and conveniently; to provide an arrangement of the class described which shall be comparatively simple and inexpensive to make and install and which shall be inexpensive and efficient to operate and maintain, and in general to provide an improved arrangement of the character referred to.

In the drawings which illustrate my invention as applied to a head used for wrapping a cotton covering around a metallic conductor—

Fig. 1 is a vertical section through the insulating head and its support;

Fig. 2 is a section taken on the line 2—2 of Fig. 1;

Fig. 3 is a section taken on the line 3—3 of Fig. 1;

Fig. 4 is a perspective view of the upper portion of the head, the spindle and a portion of the bowl being cut away for the sake of clearness;

Fig. 5 is a section taken on the line 5—5 of Fig. 1;

Fig. 6 is a section taken on the line 6—6 of Fig. 5;

Fig. 7 is a side elevation of the upstanding actuating lever; and

Fig. 8 is a section taken on the line 8—8 of Fig. 7.

In the drawings 10 represents a substantial cast iron frame which carries the rotary spindle on the upper portion of which the head proper is mounted. The spindle 11, the lower end of which may be supported in any suitable bearing, carries a spur pinion 12 which meshes with a spur gear 13 driven by any suitable source of power so as to cause the spindle 11 to rotate at several thousand revolutions per minute. The upper end of the spindle is fitted with a fixed collar 14 slightly less in diameter than a stationary cup 15 which is supported in an upper extension 16 of the frame 10.

The upper end of the cup 15 is made with a cylindrical recess in which is rigidly supported the outer race 17 of a ball bearing the inner race 18 of which is forced onto and rotates with the spindle 11. Above the inner race 18 the shaft 11 also is fitted with a fixed collar 19 which serves as a support for the hub 20 of the bowl 21. In order to cause the bowl 21 to turn with the shaft or spindle 11 a small pin 22 is inserted radially into the side of the tubular spindle 11 and registers with a small notch or recess 23 in said hub 20.

The hub 20 fits the spindle 11 somewhat closely and is extended upwardly to form an annular flange 24 which is forced downwardly by a sleeve 25. Pressure is applied to the sleeve 25 by means of a lock nut 26 which is threaded onto the upper end of the spindle 11, as indicated at 27. On the upper end of the spindle is rigidly secured a cylindrical collar or block 28 in which is rigidly secured the lower end of the wire guide 29.

In order to secure efficient operation of my device under all conditions, I preferably mount the tube 30 which carries the wrapping material 31, in this instance cotton, on a member which is freely rotatable on the spindle 11. To this end I secure on the internal flange portion 24 of the bowl the inner race 32 of a radial ball bearing, the outer race 33 of which is pressed into a cylindrical recess formed on the under side of a drum 34. Said drum 34 is extended upwardly in the form of a sleeve 35, the upper end of which sleeve is a nice running fit on a slight enlargement 36 of the clamping sleeve 25.

As shown best in Fig. 3, the rotary sleeve extension 35 is made with one or more ribs or fins 37, the purpose of which is to expand slightly the resilient paper tube which carries the cotton, thereby locking same securely to said sleeve 35.

It will be manifest that by reason of this arrangement the tube of cotton will spin freely in the interior of the bowl 21.

Referring now to Figs. 4, 5 and 6 it will be seen that on the floor or bottom of the bowl 21 I mount a brake lever 38, said brake 38 being pivoted on a vertical axis on the shouldered screw 39 secured in the floor of the bowl. The inner end of the brake lever 38 is made with an obliquely arranged pad or shoe 40 on the tip of which there is secured by means of a screw 41 a narrow band or strip of leather 42. The leather band 42 is brought around the tip of the shoe 40 and between the drum 34 and the shoe 40, its free end being connected to the inner end of a coiled wire tension spring 43. The other end of the tension spring 43 is hooked around a small screw 44 threaded into the floor of the bowl 21.

The other end 45 of the brake lever 38 is enlarged and slotted, as shown at 46, in order to admit loosely the lower end of an upstanding actuating lever 47 in which lower end there is rigidly secured a steel ball 48, the sides of the ball projecting beyond the sides of the lower end 47. As shown best in Fig. 5 the inner opposed faces of the slot 46 are formed with circular grooves or channels 49, preferably made by drilling vertically through the slot 46 with a drill slightly larger than the diameter of the ball 48, so that the latter will constitute a floating pivot connecting the two levers. It will be understood that the part 47 has sufficient clearance in the slot 46 to permit the desired amount of relative rocking movement of the two parts. The upper end of the actuating lever 47 is preferably enlarged as shown at 50 and in said enlargement there is rigidly secured a hardened steel bushing 51, the ends of which are suitably rounded to minimize friction and to prevent injury to the strand or filament of wrapping material. As shown in the drawings, the outer end of said bushing 51 is enlarged or flanged slightly, as shown at 52, while the intermediate or cylindrical portion of the bushing 51 is capable of sliding freely in a horizontal slot 53 in the upper portion of the bowl 21. One end of said slot 53 is enlarged, as shown at 54, to enable the bushing 51 to be inserted through the bowl side when the apparatus is being assembled.

Adjacent the lower end of the upstanding lever 47 there is an elongated enlargement 55 vertically slotted as shown at 56 in order to ride in pivotal relation on a pin 57 fixedly secured in the wall of the bowl, as shown in Fig. 1. In view of the high speed of rotation the levers 38 and 47 are preferably constructed of aluminum or other light metal and in order still further to prevent friction of the actuating lever 47 due to centrifugal action, I preferably insert in the outer face of said lever 47 a small steel ball 59 which engages and rides upon the inner periphery of the bowl, and thus prevents other portions of the lever from engaging therewith. If desired, a suitable sheet metal casing 58 may be secured to the inside of the bowl wall in order to cover up certain portions of the actuating parts.

From an inspection of the drawings in connection with the above description, it will be manifest that the brake lever 38 and the actuating lever 47 have substantially no tendency to swing on their pivots due to centrifugal action. Hence the device will maintain its adjustment and will subject the thread to the required degree of tension, irrespective of the speed at which the spindle is rotated.

I will now describe the operation of my improved apparatus. It will be understood that the metallic conductor 60 is drawn through the tubular spindle 11 by any suitable device which will insure an even steady movement bearing a substantially fixed relation to the speed of rotation of the spindle and the width of wrapping material which is being employed to cover the conductor. I have not shown such apparatus for the reason that such capstan devices are well known to those skilled in this art. The end of the wrapping filament 61 as it unwinds from the circumference of the tube of wrapping material is led through a slot 62 arranged vertically in the side wall of the bowl 21 and from said slot passes around a portion of the outer circumference of the bowl to bushing 51. The filament passes through the bushing and thence directly to the wire guide, as shown in Fig. 1. As is customary with such wire guides, the upper end thereof is milled off substantially to a diametric plane, as shown at 63 in Fig. 2, one edge of said milled surface being cut away, as shown at 64, to form a guiding surface for laying the wrapping material in a spiral wrap covering the surface of the conductor 60. It will of course be understood that the conductor 60 is relatively stationary so that when the spindle 11 is rotated all of the parts carried thereby, including the filament, will be rotated around the stationary wire and the latter will be covered or insulated. As the wire is covered the filament 61 of covering material will be drawn out gradually through the bushing 52 and slot 62, the tube of cotton rotating relative to the other rotating parts of the head to permit such unwinding action. Assuming now that the filament 61 for any reason develops a tendency towards slackness or insufficient tension, the spring 43 will be permitted to swing the lever 38 in a direction to cause the shoe 40 to press the strap 42 against the circumference of the brake drum 34. As soon, however, as the process of winding the filament around the conductor has taken out the slack in the filament and developed the necessary amount of tension, the upper end of the actuating lever 47 will by reason of the pull on the filament be moved in the direction of the arrow 65, thus rocking the brake lever 38 in a direction to release the brake and permit the tube of material to rotate on the spindle. The arrangement is such that in actual practice there will be no jumps or moments of excessive alternate tightness or slackness of the filament which will be unwound from the spiral and wound up on the wire with substantial uniformity of tension. The strength of spring 43 is of course suitably co-ordinated with the length, curvature and degree of obliquity of the shoe 40 to give the proper braking effect and desired thread tension.

The advantages of securing a definite and uniform tension of the wrapping material will be readily understood by persons skilled in this art. One of the principal advantages is in the economy of covering material, especially in those cases where the effective covering width of the filament is influenced by the tension to which the filament is subjected while it is being applied to the conductor. For instance, it is found that in the case of the ordinary insulating heads which are not equipped with such a device, the tension of the material where the tube of cotton is full and of maximum diameter is obviously a small fraction of what the tension is when the tube is approaching exhaustion and is hence of minimum diameter. Where no attempt is made to automatically control the tension, the adjacent turns or wraps of insulating material, being under insufficient tension when the tube of cotton is full are of excess width and overlap at their edges, causing a waste of insulating material and an increase in the diameter of the insulated wire. The latter fault is highly objectionable in those cases where it is necessary to figure very closely on the diameter of the insulated wire in order to accommodate the desired number of turns in a given winding space, for instance, an armature slot.

If on the other hand, the operator attempts to adjust the tension to an amount which will be correct with a full tube of cotton, the decrease in the diameter of the tube as the unwinding progresses will very soon cause an excessive tension on the cotton, possibly resulting in a breakage of the filament and very frequently causing what is termed "spaced" insulation by reason of the excessive tension causing a contraction in the width of the filament.

The invention is of considerable importance in that it does not require the constant attention of a skilled operator, since the device once properly adjusted will need no further attention, automatically accommodating itself to tubes of cotton of any diameter.

It will be understood that the described details of construction are merely illustrative of one phase of my invention, the scope of which should be determined by reference to the appended claims, said claims being considered as broadly as possible consistent with the state of the art.

I claim:

1. In a head for insulating electrical conductors with a filament of textile material, the combination of a rotary hollow spindle, a brake drum concentric with, carried by, and rotatable on said spindle for supporting a tube of said filament, a brake lever carried by said spindle and pivoted on an axis parallel with the spindle axis and engaging said drum, a spring carried by said spindle for automatically applying said brake and retarding rotation of the tube on said spindle, and an actuating lever arranged substantially parallel with the axis of the spindle engaging the brake lever and actuated by the tension of the filament in passing from the tube to the conductor.

2. In an insulating head for wrapping a textile filament around an electrical conductor, the combination of a rotary hollow spindle through which the conductor is drawn, a sleeve for supporting the tube of insulating filament and concentric, and carried by, and rotatable on said spindle, said sleeve being provided with a braking surface, a brake lever carried by said spindle and pivoted thereon on an axis parallel to the spindle axis, a spring connected to said brake for applying same to the braking surface of the sleeve and retarding rotation of the tube on the spindle, means for conducting the filament to the wire, whereby rotation of the spindle will result in the filament being spirally applied to said conductor, and a movable member also carried by the spindle and acted on by the filament intermediate the tube and the conductor for actuating the brake lever, whereby an increase in tension of the filament will automatically release the brake.

3. In an insulating head for wrapping a textile filament around an electrical conductor, the combination of a rotary hollow spindle through which the conductor is drawn, a sleeve for supporting the tube of insulating filament and concentric, and carried by, and rotatable on said spindle, said sleeve being provided with a braking surface, a brake lever carried by said spindle and pivoted thereon on an axis parallel to the spindle axis, a spring connected to said brake for applying same to the braking surface of the sleeve and retarding rotation of the tube on the spindle, means for conducting the filament to the wire, whereby rotation of the spindle will result in the filament being spirally applied to said conductor, and a pivoted lever also carried by the spindle and acted on by the filament intermediate the tube and the conductor for actuating the brake lever, whereby the increase in tension of the filament will automatically release the brake.

4. In a head for wrapping filament around a wire, the combination of a rotary hollow spindle through which the conductor may be drawn, means for rotatively supporting on said spindle a tube of said filament, a brake drum carried by said means and of less diameter than the diameter of a full tube, a brake lever mounted to oscillate on said spindle, the pivotal point thereof being located intermediate the axis of the spindle and the circumference of a full tube, and a second lever co-operating with the first lever and acted upon by the thread as it is drawn from the tube and wrapped on the wire for automatically maintaining said thread under the desired tension.

5. In an insulating head for wrapping a textile filament around an electrical conductor, the combination of a rotary hollow spindle through which the conductor may be drawn, a bowl carried by said spindle having a diameter not substantially greater than necessary to receive a tube of filament, means rotatable around said spindle for supporting said tube co-axial with said spindle, a brake drum carried by said means, a brake lever co-operating with said drum carried by said spindle and pivoted on an axis parallel with the spindle axis and located at a point intermediate the axis of the spindle and the circumference of the full tube, a second actuating lever arranged substantially parallel with the axis of the spindle and having one end thereof engaging an end of said brake lever, said actuating lever co-operating with and being controlled by the filament as it is drawn from the tube and wrapped around the wire by the rotation of the spindle, the pull of the filament tending to release said brake, and a spring tending to apply said brake.

6. In an insulating head for wrapping a textile filament around an electrical conductor, the combination of a rotary hollow spindle through which the conductor may be drawn, a bowl carried by said spindle having a diameter not substantially greater than necessary to receive a tube of filament, means rotatable around said spindle for supporting said tube co-axial with said spindle, a brake drum carried by said means, a brake lever co-operating with said drum carried by said spindle and pivoted on an axis parallel with the spindle axis and located at a point intermediate the axis of the spindle and the circumference of the full tube, a second actuating lever arranged substantially parallel with the axis of the spindle and having one end thereof engaging an end of said brake lever, said actuating lever co-operating with and being controlled by the filament as it is drawn from the tube and wrapped around the wire by the rotation of the spindle, the pull of the filament tending to release said brake, and a spring tending to apply said brake, said levers being arranged to form substantially the legs of a right angle, the corner of which is located adjacent the outside of one corner or edge of a full tube.

FRANK A. TIBBALS.